Figure 1:
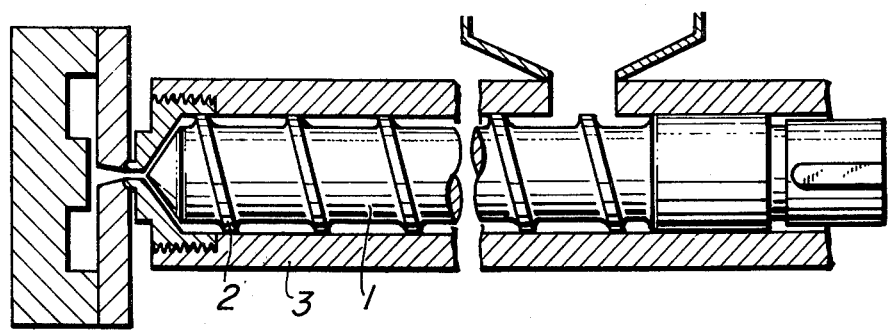

United States Patent [19]

Horie et al.

[11] 4,134,688

[45] Jan. 16, 1979

[54] THERMOSETTING RESIN INJECTION MOLDING MACHINE AND METHOD

[75] Inventors: Masayoshi Horie, Tokyo; Kikuto Yamazaki, Yokohama, both of Japan

[73] Assignee: Sumitomo Bakelite Company Limited, Tokyo, Japan

[21] Appl. No.: 642,325

[22] Filed: Dec. 19, 1975

[30] Foreign Application Priority Data

Dec. 21, 1974 [JP] Japan ............................. 49-146320

[51] Int. Cl.² .................................................. B29B 1/06
[52] U.S. Cl. ................................................ 366/81; 264/68; 425/208
[58] Field of Search ................ 259/9, 10, 191, 192, 259/193, DIG. 13; 425/204, 208, 587; 264/68; 366/81, 88

[56] References Cited

U.S. PATENT DOCUMENTS

| 3,486,193 | 12/1969 | Gwinn .................... 425/207 |
| 3,762,692 | 10/1973 | Schippers ............... 259/191 |
| 3,788,612 | 1/1974 | Dray ...................... 425/208 |
| 3,826,477 | 7/1974 | Kunogi .................... 425/587 |
| 3,865,354 | 2/1975 | Burpulis et al. ......... 259/191 |

*Primary Examiner*—Robert W. Jenkins
*Attorney, Agent, or Firm*—Karl W. Flocks

[57] ABSTRACT

A thermosetting resin injection molding machine and method wherein a shearing and kneading barrier is formed at one end portion closer to the injection nozzle of a screw device in a heating cylinder for imparting the shearing forces to and kneading the molding compound so that the molding compound may be sufficiently kneaded before injection and may be uniformly raised in temperature immediately before injection.

14 Claims, 11 Drawing Figures

THERMOSETTING RESIN INJECTION MOLDING MACHINE AND METHOD

The present invention relates to a thermosetting resin injection molding machine incorporating therein an improved kneading screw and a thermosetting resin injection molding method utilizing the improved screw.

The property of the thermosetting resins, which must be distinguished from that of the thermoplastic resins, is that the thermosetting resins are plasticized by the first application of heat and then hardened by the second application of heat and that the once hardened thermosetting resins cannot be plasticized again. Therefore the molding of the thermosetting resins gives rise to various problems which are not encountered in the thermoplastic resin molding. In the thermosetting resin molding machine, a full flight screw with a low compression ratio is used in order to avoid the curing of the molding compound while the compound is being conveyed within the heating cylinder or barrel. Therefore, the molding compound of the thermosetting resin has not been satisfactorily mixed and kneaded: Hence, the shot injected into the mold has no uniform temperature distribution so that it is difficult to mold the articles with the same and uniform quality. When the temperature of the molding compound injected into the mold varies over a wide range, the curing time must be determined depending upon the lowest temperature. As a result, the injection molding cycle becomes longer and consequently the high productivity cannot be attained.

In order to overcome the above problems, there has been proposed to use a screw with a compression ratio higher than that of the screws used in the conventional injection molding machines, but within the heating cylinder the greater shearing and compression forces are exerted to the molding compound so that it is adversely heated to high temperatures and consequently is not maintained in the thermally stable state. That is, the molding compound is imparted with the mechanical shearing forces from the screw flights so that the curing occurs within the cylinder before the injection. Therefore such a high compression ratio screw can be used only when a special molding compound is used under special molding conditions. In other words, such a screw cannot be used with any kind of thermosetting resins.

The present invention was therefore made to overcome the above and other problems encountered in the prior art thermosetting resin injection molding machines and methods.

Briefly stated, to the above and other ends, the present invention provides a thermosetting resin injection molding machine wherein one end closer to the injection nozzle of a screw shaft, which may be of the conventional type, is enlarged in diameter to form a shearing and kneading barrier provided with grooves, projections or smooth surface, so that the the shearing forces are imparted to the molding compound thereby uniformly heating the molding compound to a predetermined temperature and attaining the satisfactory mixing and kneading of the molding compound before the injection and positively preventing the backward flow of the molding compound during the injection.

The present invention also provides a thermosetting resin injection molding method capable of considerably reducing the curing time and of producing the molded articles of uniform and stable quality.

The present invention will become apparent from the following description of some preferred embodiments thereof taken in conjunction with the accompanying drawing.

FIG. 1 is a schematic view of a prior art screw in-line type thermosetting resin injection molding machine; and FIGS. 2A, 2B through 8A, 8B are views of preferred embodiments of a barrier in accordance with the present invention, in which FIGS. 2B, 3B, 4B, 5B, 6B, 7B and 8B are vertical cross-sectional views taken along the lines IIB—IIB, IIIB—IIIB, IVB—IVB, VB—VB, VIB—VIB, VIIB—VIIB, and VIIIB—VIIB of FIGS. 2A, 3A, 4A, 5A and 6A, 7A and 8A respectively.

PRIOR ART, FIG. 1

Prior to the description of the preferred embodiments of the present invention, the prior art screw, in-line type injection molding machine of the thermosetting resins will be briefly described in order to specifically point out the drawbacks thereof, which the present invention may overcome as will be described in detail hereinafter. The injection molding machine shown in FIG. 1 has a full-flight type screw with a low compression ratio (in general between 0.9 and 1.3) consisting of a shaft 1 and a screw flight 2. The screw flight 2 is so designed and constructed that the generation of heat due to the shearing forces may be minimized in order to prevent the curing of the molding compound while the latter is forced through the cylinder toward the injection nozzle thereof and that the molding plastic may be suitably plasticized until it reaches the injection nozzle. However, such screw flight design has some drawbacks that the molding plastic tends to be supplied backward, that the sufficient mixing and kneading of the molding compound cannot be attained and that when the molding compound is injected into the dies, it tends to flow in the reverse or opposite direction along the screw flight. If the compression ratio is increased, as described above, in order to eliminate these drawbacks, the molding compound starts curing before it reaches the injection nozzle. As a result, the rotation of the screw is stopped and consequently the injection molding cannot be carried out.

THE INVENTION, FIGS. 2A, 2B THROUGH 8A, 8B

In FIGS. 2A, 2B through 8A, 8B, there are shown the preferred embodiments of an improved thermosetting injection molding machine in accordance with the present invention. The dimension and shape of the screw shaft, the design and arrangement of the screw flights and the compression ratio may be substantially similar to those of the conventional screws in the conventional injection molding machines.

Briefly stated, according to the present invention, the end portion on the side of injection of the screw is not provided with a flight, but is enlarged in diameter and is provided with a kneading barrier 4. An annular passage for flowing the molding compound to the injection nozzle is defined between the inner wall surface of the cylinder 3 and the kneading barrier portion 4.

Figure 2A:
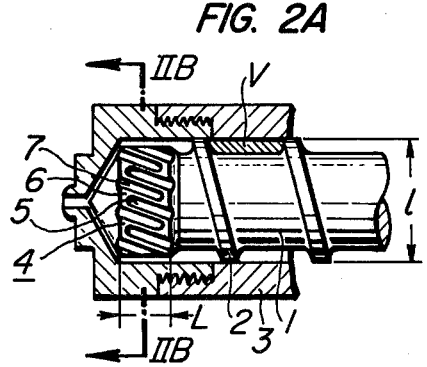
Figure 2B:
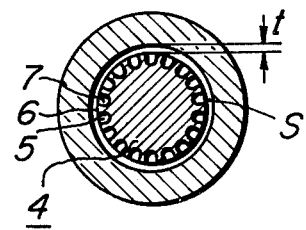

In the embodiment shown in FIGS. 2A, 2B, the kneading barrier portion 4 is provided with slanting elongated grooves 5 and 7 formed around the peripheral surface of the barrier portion 4 at angles relative to the axis of the screw shaft 1. Therefore, the molding compound is forced to pass through the groove 5, over the land 6, through the groove 7, over the land 6 and so on.

In the embodiments shown in FIGS. 3A, 3B and 6A, 6B a plurality of slanting grooves 8 are formed around the pheripheral surface of the barrier portion 4 at angles relative to the axis of the screw shaft 1. Therefore the molding compound is forced through these grooves 8.

Figure 7A:
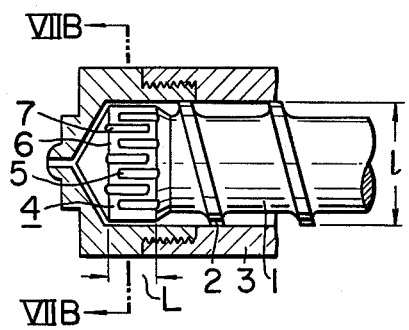
Figure 8A:
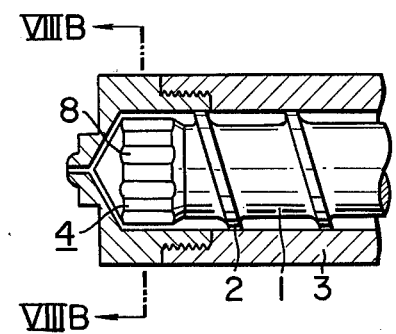
Figure 7B:
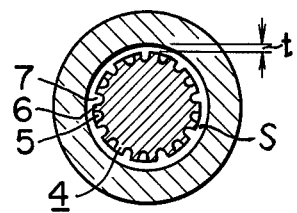
Figure 8B:
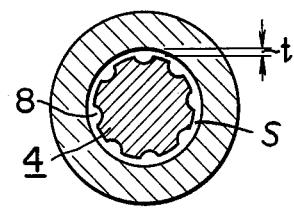

In the embodiment of FIGS. 7A, 7B the grooves 5 and 7 are parallel to the axis of screw shaft 1 and in FIGS. 8A, 8B the grooves 8 are parallel to the axis of screw shaft 1.

Figure 4A:
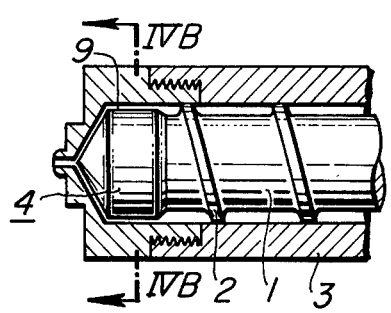
Figure 4B:
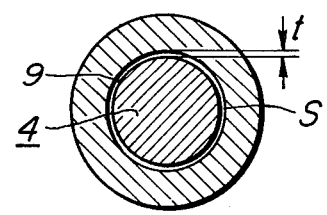

In the embodiment shown in FIG. 4A, 4B, the molding compound is forced through the annular passage formed between the inner wall surface of the cylinder 3 and the peripheral surface 9 of the barrier portion 4.

Figure 5A:
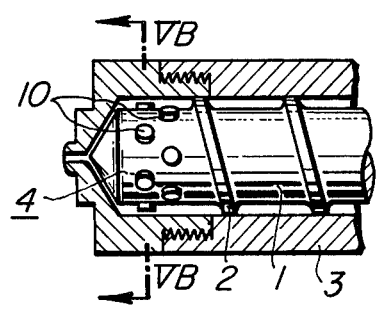
Figure 5B:
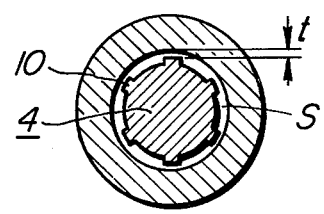

In the embodiment shown in FIGS. 5A, 5B, a plurality of pins 10 are extended in zig-zag form from the peripheral surface of the barrier portion 4. The molding compound therefore is forced through the spaces between these pins.

In all of the embodiments described above, the molding compound transported by the screw 2 in the cylinder 3 is subjected to the strong shearing forces when the molding compound is passing through the annular passage between the cylinder 3 and the barrier portion 4 so that the molding compound may be instantaneously heated immediately before it is injected into the molding dies. As a result, the molded article may be removed from the mold in a very short length of time because it is immediately cured in the mold. Therefore, the injection molding cycle may be considerably reduced. Furthermore since the molding thermoset is sufficiently mixed and kneaded before it is injected, there is obtained a constant reaction degree upon curing the resin within the mold and no production variety in quality among the molded articles.

The above described barrier arrangements have been already used in the thermoplastic injection molding and extrusion machines, but they have never been used in the field of thermosetting resin injection molding. In the thermoplastic injection and extrusion machines, the spacing or clearance between the cylinder and the barrier is of the order of 0.1 to 0.5 mm, and if this clearance is increased in excess of this order, the satisfactory distribution, mixing and kneading of the thermoplastic compounds cannot be attained. If the thermoplastic injection molding machine with such barrier is used for the injection molding of thermosets, too much heat is generated by the shearing forces exerted to the molding thermoset so that the molding thermoset is too prematurally cured and its flow is so reduced that it cannot pass through the barrier portion.

However, according to the present invention, the clearance t is selected of the order from 0.6 to 8.0 mm which may be considered so much greater than the clearance of the prior art thermoplastic injection and extrusion machines that the desired effects of the barrier cannot be attained at all. It is this greater clearance that overcomes the problems of curing of the thermosets before injection. Thus, the barrier may be used in the thermosetting injection molding method and machine. Therefore, as compared with the prior art thermosetting injection molding machines and methods as shown in FIG. 1, the injection temperature may be remarkably increased and may be uniformly distributed through the shot so that the setting time may be considerably reduced. Furthermore, the backward flow of the molding compound, which is encountered in the injection molding machine of the type shown in FIG. 1, when the compounds are injected, may be positively prevented. Thus, articles with stable and uniform quality may be molded.

Figure 3A:
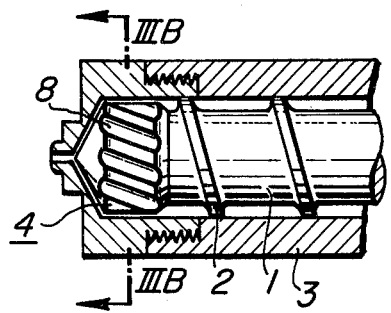
Figure 3B:
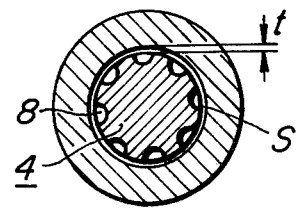
Figure 6A:
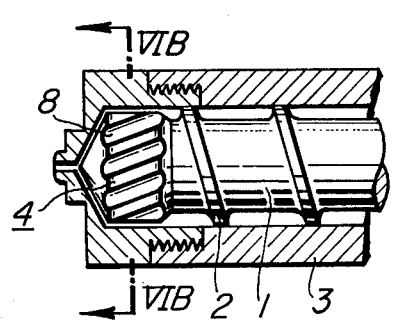
Figure 6B:
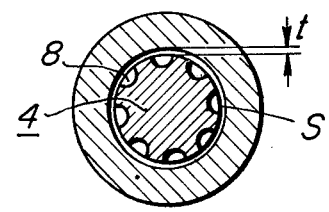

Next, the barriers in accordance with the present invention will be described in more detail hereinafter. The screw used in the present invention may be similar to the conventional screws having a flight pitch almost equal to the diameter of the screw flights. However, the length L of the barrier 4 is preferably 0.3 to 2 times the diameter 1 of the screw device, and is more preferably approximately equal to the diameter 1 of the screw device. The grooves of the barrier 4 may be partially extended and alternately opened at one end thereof at the front and rear sides of the barrier 4 as shown in FIG. 2A. Alternatively, the grooves may be fully extended from the rear to the front ends as shown in FIG. 3A. Furthermore, the axis of the groove may be in parallel with the axis of the screw or may be inclined in the direction opposite to the direction of inclination of the screw flight as shown in FIG. 6A: The grooves may have any suitable cross sectional configurations (taken along, for instance, the line IIB—IIB of FIG. 2A) such as semi-circular, semi-elliptical, U-shaped, V-shaped sections including those in the form of a reverse-trapezium. The depth of the grooves is preferably between about 2 and 5 mm. The number of the grooves is not limited, but it is preferable between 8 and 12. The ratio V/S between the cross sectional area V cut at right angles to the flights of the space defined between the adjacent screw flights in the cylinder 3 and the cross sectional area S of the annular passage between the barrier and cylinder taken along the lines IIB—IIB through VIIIB—VIIIB is preferably between 0.3 and 0.7 and more preferably between 0.4 and 0.6. The number and depth of the barrier grooves may be determined depending upon a selected V/S ratio.

According to the present invention, instead of the grooves the projections or pins having a height of about 2 to 5 mm may be extended from the peripheral surface of the barrier as shown in FIG. 5A. The number and height of the barrier projections may also be determined depending on a selected V/S ratio. The contour of the top of the projections may be round, elliptical, square, hexagonal or of any other shape. The dimensions and arrangement of the projections may be suitably selected by the skilled person.

The thermosetting injection molding machine incorporating the barrier in accordance with the present invention results in the great improvement of the thermosetting injection molding method. That is, the barrier may be considered as means for ensuring the satisfactory mixing and kneading of the thermosetting compound, raising the temperature of the shot immediately before injection and preventing the backward flow during the injection.

According to the present invention, the thermosetting compound is not cured befere injection, but its temperature is advantageously raised at the barrier so that the curing time in the mold may be considerably reduced and consequently the molded articles may be removed from the mold in a very short length of time. Therefore the injection molding cycle may be considerably reduced so that a large number of articles may be molded within a very short time.

Next some examples of the present invention will be described, but it is to be understood that the present invention is not limited thereto.

EXAMPLE 1

The thermosetting injection molding machine with the following ratings and dimensions were used:

| | |
|---|---|
| Molding die clamping pressure: | 80 tons |
| Maximum injection quantity | 250 cm³ |
| Inner diameter of cylinder or barrel: | 40 mm |
| Compression ratio of screw portion: | 1 : 1 |

For the sake of comparison, the prior art injection molding machine of the type shown in FIG. 1 was also used.

The barrier grooves were cut as shown in FIGS. 2A, 2B, but their axes were made in parallel with the screw shaft. The barrier is as follows:

| | |
|---|---|
| Clearance: | 2 mm |
| Cross section of grooves: | semi-circle of a diameter 6 mm |
| Number of grooves: | 10 |
| Length of barrier: | approx. 40 mm |
| V/S ratio: | ½ |

The composition of the thermosetting injection molding compound used is as follows:

| | |
|---|---|
| Phenol resin: | 50 % by weight |
| Wooden powder: | 40 % by weight |
| Hardner: | 7 % by weight |
| Pigment Lubricant and Accelerator: | 3 % by weight |

The molding conditions are as follows:

| | |
|---|---|
| Temperature of cylinder: | 90° C (front) to 50° C (at rear) |
| Temperature of molding dies: | 180° C |
| Rotation of screw: | 60 r.p.m. |
| Mold cavities: | 4 |
| Shot: | 60 gr. (for 4 molds) |
| Injection stroke: | 50 mm |

Under the above conditions, the four plates 6 × 20 × 100 mm were molded. The comparison results are shown in Table below:

| | Prior Art | Invention | Reduction |
|---|---|---|---|
| MBFT* | 30 sec. | 24 sec. | 20% |
| Curing time at Barcol Hardness 40 (No. 935) measured just after removal of articles from mold | 50 sec. | 30 sec. | 40% |
| Molding cycle | 60 sec. | 40 sec. | 33% |
| Temperature of compound injected | 115° C | 125° C | — |

*MBFT = minimum blister free time

EXAMPLE 2

Following the procedure of Example 1, the handles of frying pans were molded under the following conditions:

| | | |
|---|---|---|
| Maximum thickness: | 30 | mm |
| Shot: | 150 | gr. |
| Mold cavities: | 2 | |
| Injection stroke: | 130 | mm |

The comparison results are shown in Table below:

| | Prior Art | Invention | Reduction |
|---|---|---|---|
| MBFT | 40 sec. | 28 sec. | 30% |
| Molding cycle | 52 sec. | 40 sec. | 23% |
| Temperature of compound injected | 113° C | 124° C | — |

From the above Examples the remarkable effects and features of the present invention are apparent.

There will now be obvious to those skilled in the art many modifications and variations of the above described structure. These modifications and variations will not depart from the scope of the invention if defined by the following claims.

What is clamied is:

1. A screw device for a thermosetting resin injection molding machine, wherein said screw device is placed in a heating cylinder having an injection nozzle coaxially thereof of said heating cylinder and having one end on the side of the injection nozzle terminated into a kneading barrier, and the ratio of the cross sectional area cut at right angles to the flights of a spiral resin passage defined by the inner surface of the heating cylinder and the adjacent screw flights to the cross sectional area of an annular resin passage defined between said barrier and the inner surface of the heating cylinder is 0.3 to 0.7.

2. A thermosetting resin injection molding machine comprising
an injection nozzle, a rotary screw device having an end at said injection nozzle and enclosed in a heating cylinder extending coaxially thereabout, and
means to mechanically impart shearing and kneading force to the thermosetting resin to uniformly heat the resin to its curing temperature as is passes said end of said rotary screw, said means comprising a kneading barrier formed on said end of said rotary screw device at said injection nozzle, the outer periphery of said barrier and the inner surface of said heating cylinder defining an annular passage therebetween through which to pass the thermosetting resin said passage having a clearance from 0.6 to 8.0 mm.

3. A thermosetting resin injection molding machine as set forth in claim 2, wherein a plurality of projections are extended radially outwardly from the peripheral surface of said barrier.

4. A thermosetting resin injection molding machine as set forth in claim 2, wherein a plurality of grooves are formed in the peripheral surface of said barrier.

5. A thermosetting resin injection molding machine as set forth in claim 4, wherein said grooves consist of a plurality of first grooves each of which extends from one side of the peripheral surface of said barrier and terminates before reaching the other side of the peripheral surface and a plurality of second grooves each of which extends from said the other side and terminates before reaching said one side, said first and second grooves being alternately arrayed.

6. A thermosetting resin injection molding machine as set forth in claim 5, wherein the axes of said grooves are inclined at angles to the axis of said screw device.

7. A thermosetting resin injection molding machine as set forth in claim 5, wherein the axes of said grooves are in parallel with the axis of said screw device.

8. A thermosetting resin injection molding machine as set forth in claim 5, wherein the depth of said grooves is about 2 to 5 mm.

9. A thermosetting resin injection molding machine as set forth in claim 4, wherein the axes of said grooves are inclined at angles to the axis of said screw device.

10. A thermosetting resin injection molding machine as set forth in claim 4, wherein the axes of said grooves are in parallel with the axis of said screw device.

11. A thermosetting resin injection molding machine as set forth in claim 4, wherein the depth of said grooves is about 2 to 5 mm.

12. A method for injection molding thermosetting resins with the use of a screw in-line type injection molding machine having a kneading barrier on the end of the screw at the injection nozzle, comprising the steps of feeding a thermosetting resin into a heating cylinder, moving the thermosetting resin along the inner surface of said heating cylinder to one end of said heating cylinder in the direction of an injection nozzle by rotary motion of a screw device, mechanically imparting a shearing force to the thermosetting resin while forcing the thermosetting resin over a rotating kneading barrier on the end of said screw device near said injection nozzle, while simultaneously thermally heating the thermosetting resin as it passes through an annular passage, whose clearance is from 0.6 to 8.0 mm, defined between the inner surface of said heating cylinder and the outer periphery of said rotating barrier, and forcing the thermosetting resin through said injection nozzle.

13. A thermosetting resin injection molding machine characterized in that a rotary screw device is enclosed in a heating cylinder coaxially thereof, and a kneading barrier is formed at one end of said screw device on the side of an injection nozzle, the outer periphery of said barrier and the inner surface of said heating cylinder defining an annular passage therebetween to pass the thermosetting resin through said annular passage, said passage having a clearance from 0.6 to 8.0 mm whereby the shearing forces are mechanically imparted to the thermosetting resin passing over said kneading barrier, said kneading barrier having an axial length approximately 0.3 to 2 times the diameter of said screw device, a plurality of grooves formed in the peripheral surface of said kneading barrier, said grooves having a depth of about 2 to 5 mm, and the ratio of the cross-sectional area cut at right angles to the flights of a spiral resin paggage defined by the inner surface of said heating cylinder and the adjacent screw flights to the cross-sectional area of an annular resin passage defined between said barrier and the inner surface of said heating cylinder is 0.3 to 0.7.

14. An injection molding machine for the injection molding of a thermosetting resin, comprising means to pass the molten thermosetting resin into an injection mold, said means comprising an injection nozzle;

means to advance the thermosetting resin toward said nozzle while minimizing the generation of heat due to shearing forces applied to said resin in order to prevent the premature curing of said thermosetting resin, said means comprising a rotary screw having a low compression ratio on the order of about 0.9 to 1.3 and a generally cylindrically shaped heating cylinder extending co-axially about said rotary screw, said heating cylinder terminating at said injection nozzle; and means to mechanically impart shearing and kneading force to the thermosetting resin immediately before it passes into said injection nozzle and in order to uniformly heat the resin to its curing temperature, said means comprising an enlargement formed on the end of said rotary screw adjacent said injection nozzle, the outer periphery of said enlargement and the inner surface of said heating cylinder forming an annular passage therebetween through which the thermosetting resin passes, said passage having a clearance from 0.6 to 8.0 mm, the axial length of said enlargement being 0.3 to 2 times the diameter of said screw, and the ratio between the cross-sectional area at right angles to the flights of a spiral resin passage — defined by the inner surface of the heating cylinder and the adjacent screw flights — to the cross-sectional area of the annular passageway between said barrier and the inner surface of the heating cylinder, being 0.3 to 0.7

* * * * *